US007489953B2

(12) United States Patent
Griffin

(10) Patent No.: US 7,489,953 B2
(45) Date of Patent: Feb. 10, 2009

(54) MOBILE COMMUNICATION DEVICE

(75) Inventor: Jason T. Griffin, Kitchener (CA)

(73) Assignee: Research In Motion Limited, Waterloo (CA)

( * ) Notice: Subject to any disclaimer, the term of this patent is extended or adjusted under 35 U.S.C. 154(b) by 617 days.

(21) Appl. No.: 11/143,184

(22) Filed: Jun. 2, 2005

(65) Prior Publication Data

US 2005/0272484 A1    Dec. 8, 2005

Related U.S. Application Data

(60) Provisional application No. 60/576,353, filed on Jun. 2, 2004.

(51) Int. Cl.
*H04Q 7/32* (2006.01)
(52) U.S. Cl. .............. 455/575.1; 455/575.2; 455/575.3; 455/550.1; 455/575.5; 455/90.3; D14/341; D14/138; D14/346; 379/433.01; 379/433.06; 379/433.07
(58) Field of Classification Search .............. 455/575.1, 455/550.1, 575.2, 575.3, 575, 4, 575.5, 556.1, 455/557, 90.3, 90.1, 90.2, 422.1, 403, 500, 455/517; D14/341, 138, 346; 345/168, 156, 345/169, 172; 379/433.01, 433.06, 433.07
See application file for complete search history.

(56) References Cited

U.S. PATENT DOCUMENTS

| | | | | |
|---|---|---|---|---|
| 6,046,732 A | * | 4/2000 | Nishimoto | .................. 345/168 |
| D443,612 S | * | 6/2001 | Evers et al. | ................ D14/341 |
| D467,890 S | * | 12/2002 | Lai et al. | .................... D14/138 |
| D468,307 S | * | 1/2003 | Chuang | ..................... D14/346 |
| D472,225 S | | 3/2003 | Griffin | |
| D476,985 S | | 7/2003 | Griffin | |
| D490,119 S | | 5/2004 | Griffin et al. | |
| 7,016,704 B2 | * | 3/2006 | Pallakoff | .................... 455/566 |
| 7,120,473 B1 | * | 10/2006 | Hawkins et al. | .......... 455/575.1 |
| 2003/0064757 A1 | * | 4/2003 | Yamadera et al. | ........... 455/566 |
| 2003/0171137 A1 | * | 9/2003 | Hirano et al. | ............ 455/550.1 |

(Continued)

FOREIGN PATENT DOCUMENTS

JP     2001-268188     9/2001

(Continued)

OTHER PUBLICATIONS

"Take a Closer Look at the Pocket LOOX" Press Releases: Fujitsu PC Asia Pacific; http://www.pc-ap.fujisu.com/news/2002/pr_020829_pl.html, Aug. 29, 2002; 4 pgs.

(Continued)

*Primary Examiner*—Keith T Ferguson
(74) *Attorney, Agent, or Firm*—Jones Day; Krishna K. Pathiyal; Robert C. Liang

(57) ABSTRACT

A mobile communication device includes a housing having a front wall, a rear wall, and two side walls, a display associated with the front wall, and a keyboard associated with the front wall. Each of the side walls includes a recessed channel that extends along at least part of the length of the side walls. In addition, a reduced key keyboard has arcuate rows, with a top row that includes a send, end, and web browser key. The top row of the keyboard is also arcuate.

15 Claims, 8 Drawing Sheets

U.S. PATENT DOCUMENTS

2003/0193478 A1    10/2003   Ng et al.

FOREIGN PATENT DOCUMENTS

WO    WO 03/056784 A2    7/2003

OTHER PUBLICATIONS

"Pocket LOOX 600" Specification; http://www.fujitsu-siemens.co.uk/rl/servicesupport/techsupport/pda/Pocket%20LOOX%20600/PL%20600.htm#Specification; 4 pgs., no date available.

ARAR: "First Look: A BlackBerry for Phone Lovers," PC World, Sep. 16, 2004, 3 pgs.

* cited by examiner

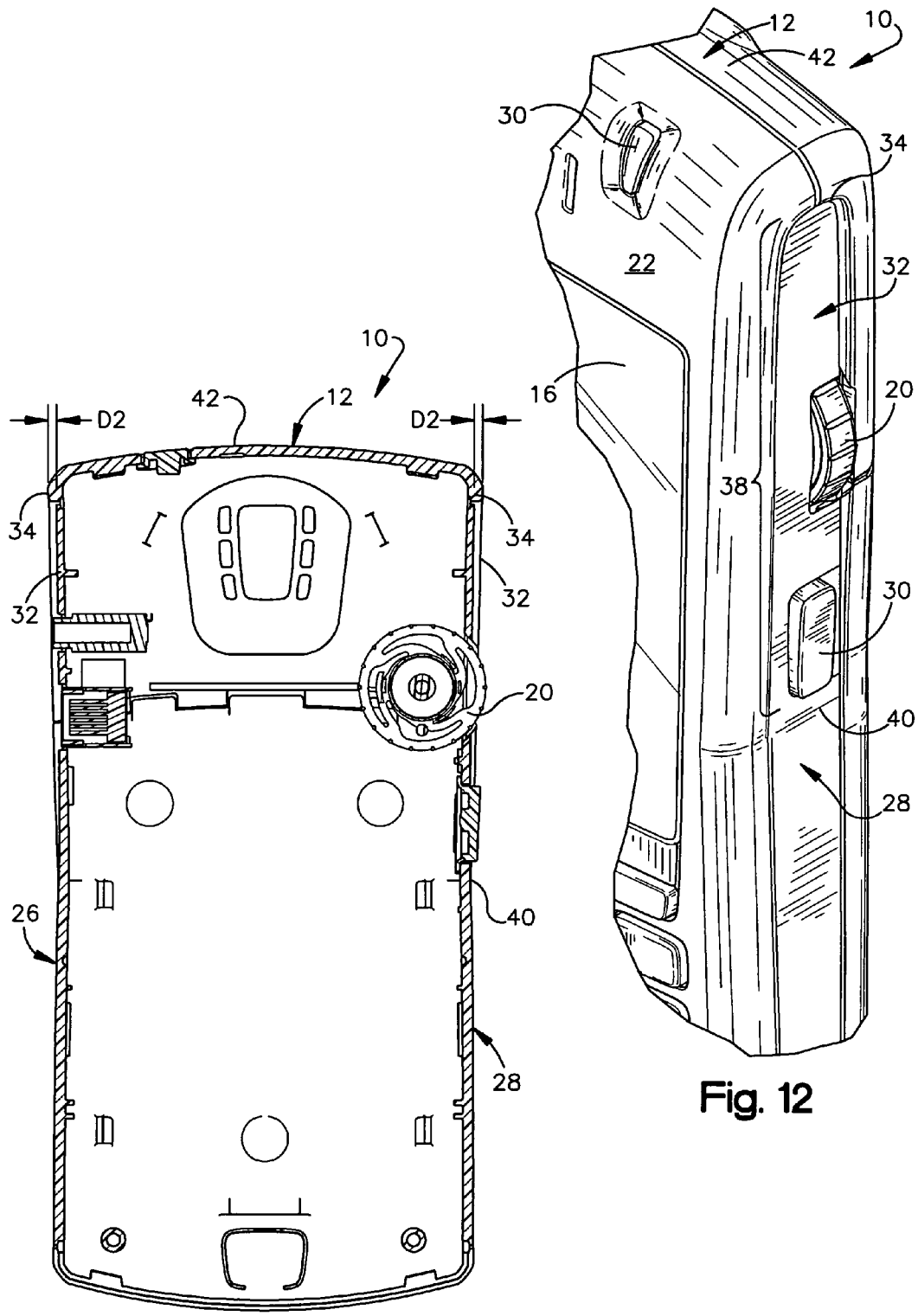

MOBILE COMMUNICATION DEVICE

CROSS-REFERENCE TO RELATED APPLICATION

This application claims priority to U.S. Provisional Application No. 60/576,353, filed Jun. 2, 2004, the disclosure of which is incorporated herein by reference in its entirety.

FIELD

This technology relates to a mobile communication device. In particular, the technology concerns a housing design for a mobile communication device and a keyboard design for a mobile communication device.

BACKGROUND

There are a number of different types of mobile communication device housings. Two examples include a "candy bar" type phone, which is a unitary housing that typically has a keyboard and display positioned on one side of the phone. Another type of phone is the "flip phone," which typically includes two parts that are designed to fold down upon one another when in the "stowed" or "closed" position. The two-part phone can be opened to reveal the keyboard and display, and is typically used as a phone in the open position. In both types of phones, the side surfaces of the housing are typically flat.

Some mobile communication devices, such as those utilized for receiving and transmitting email, utilize a thumb wheel on the side of the device for input purposes. In addition, connectors and other input/output devices are often positioned on the side of the device. Recesses 5, as shown in FIG. 1, may be formed directly around the input/output keys, or other peripherals, so that the input/output keys or other peripherals are flush with the outer surface of the device.

BRIEF DESCRIPTION OF THE DRAWING FIGURES

FIG. 11 is a cross-sectional view of the device of FIG. 10 taken at line 11-11 in FIG. 10;

FIG. 12 is an expanded partial perspective view of an example recess of the mobile communication device.

DETAILED DESCRIPTION

Figure 1:
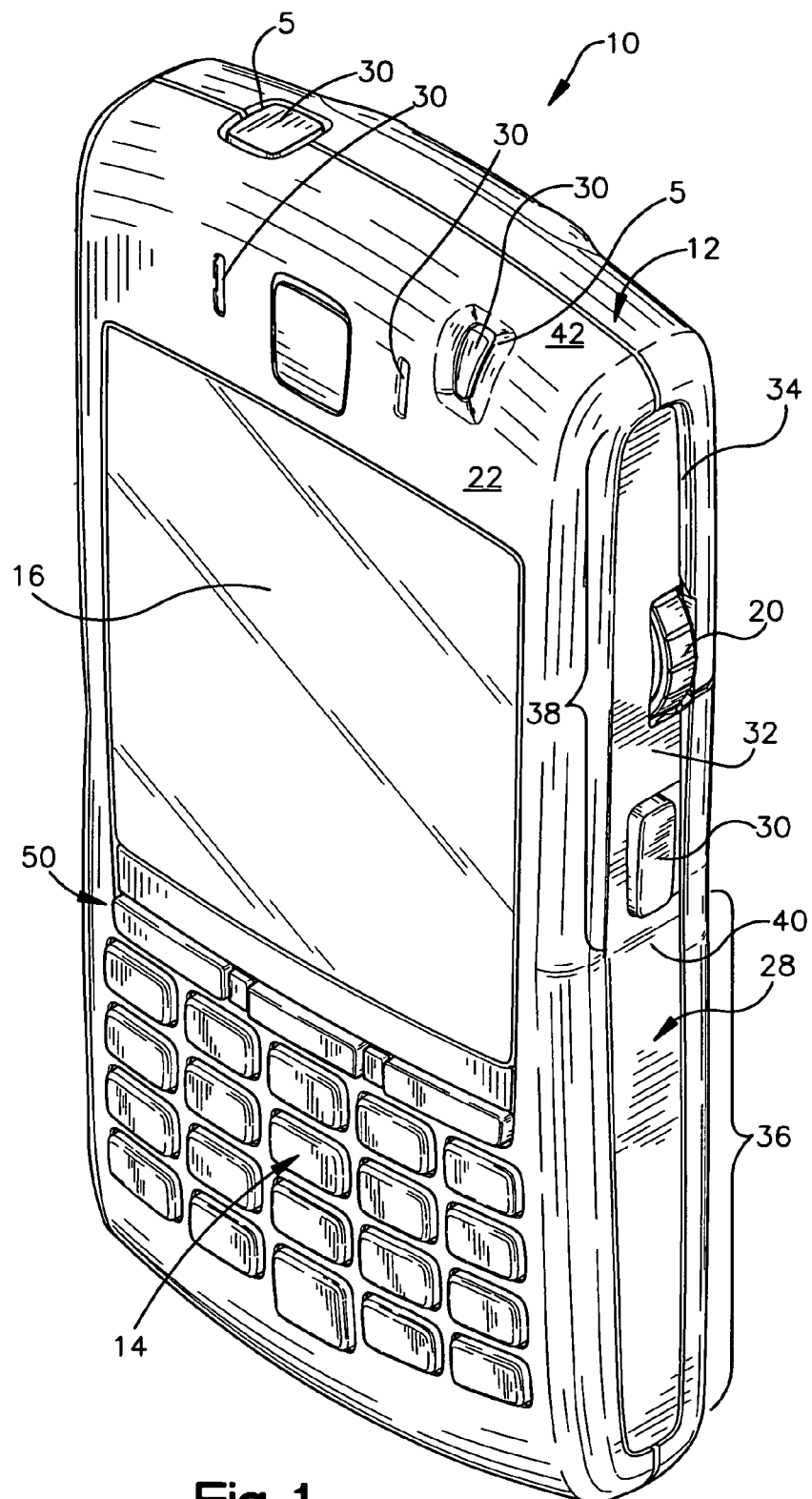
FIG. 1 is a perspective view of an example handheld communication device.

According to the claimed embodiments, a mobile communication device includes a housing having a length and at least a first side wall and a second side wall. At least one of the first and second side walls includes a recessed channel that extends along at least part of the length of the housing.

The recessed channel may be associated with both the first side wall and the second side wall. The device may also include a roller wheel associated with one of the side walls. The roller wheel is positioned in the recessed channel. The side walls may include a lower portion and an upper portion divided by a center line. Each of the recessed channels may taper from flush with the front and rear surfaces at the center line to recessed at the top of the upper portion relative to the front and rear surfaces. In an alternative embodiment, each of the recessed channels may taper from flush with the front and rear walls at a point within the lower portion to recessed relative to the front and rear walls at a point within the upper portion. In another embodiment, each of the recessed channels may be recessed relative to the front and rear walls in the upper portion. In a further embodiment, each of the recessed channels may be recessed relative to the front and rear walls in the lower portion. The upper portion may comprise the upper half of each of the side walls, and the lower portion may comprise the lower half of each of the side walls.

According to one embodiment, the housing may also include a front wall and a rear wall, with the first and second side walls being positioned between the front and rear walls. A display and a keyboard may be coupled to the front wall, and at least one input or output device may be positioned in the recessed channel.

In another embodiment, a housing for a mobile communication device comprises a front wall, a rear wall, a left side wall and a right side wall. The left side wall comprises a recessed channel that extends along at least part of the left side wall such that at least part of the left side wall is recessed relative to the front and rear walls. The right side wall comprises a recess that extends along at least part of the right side wall such that at least part of the right side wall is recessed relative to the front and rear walls.

The recessed channel on the left side wall may extend along part of the length of the side wall and the recessed channel on the right side wall may extend along part of the length of the side wall. The device may also include at least one auxiliary input and output positioned within the recessed channels. The at least one auxiliary input and outputs may comprise a roller wheel positioned in the recessed channel of the right side wall. The roller wheel may have a dimension that extends outwardly from the side wall past the front and rear walls.

In an alternative embodiment, a keyboard for a mobile communication device comprises a plurality of keys arranged in a grid pattern of a plurality of rows and a plurality of columns. Each of the keys are associated with at least one of a letter, a number, and a function. The number of keys associated with letters is fewer than 26. The letters are presented in the format of a standard keyboard arrangement of 26 letters, such that all 26 letters of the standard keyboard arrangement are presented on the keyboard at a single time. Each of the rows of the keyboard has an arcuate shape.

A top row of the plurality of rows may comprise at least a send key and an end key. The top row of keys may have substantially the same shape as the remainder of the rows. A web portal key may be positioned in the top row of keys between the send and end keys.

In another embodiment, a keyboard for a mobile communication device comprises a plurality of keys arranged in a grid pattern of a plurality of rows and a plurality of columns. Each of the keys is associated with at least one of a letter, a number, and a function. The number of keys associated with letters is fewer than 26. The letters are presented in the format of a standard keyboard arrangement of 26 letters, such that all 26 letters of the standard keyboard arrangement are presented on the keyboard at a single time. Each of the rows of keys has a shape. A send key and an end key are positioned in a top row of the keyboard. The top row may have substantially the same shape as at least one of the remainder of the rows. Alternatively, the top row may have the same shape as at least one of the remainder of the rows.

In a further embodiment, a keyboard for a mobile communication device comprises a plurality of keys arranged in a grid pattern of a plurality of rows and a plurality of columns. Each of the keys is associated with at least one of a letter, a number, and a function. The number of keys associated with letters is fewer than 26. A top row of keys includes a send key, an end key, and a web portal key.

Referring to the drawings, in a handheld mobile communication device 10 that uses a side mounted roller wheel 20 or thumb wheel 20 for navigation, it is desirable to have the roller wheel 20 protrude outwardly from the side of the device 10 a distance that provides ease of use when operating the roller wheel 20 with a user's finger or thumb, but also protects the roller wheel 20 from damage when the device 10 is accidentally dropped. It is also desirable to have a device 10 that is easy to grip and handle with less resulting fear of accidentally dropping it.

With reference now to the drawings, the example device 10 includes housing 12 having a front wall 22, a rear wall 24, and two side walls 26, 28 including a left side wall 26 and a right side wall 28. The housing 12 also includes a keyboard 14, a display 16, several input/output connectors 30, and a roller wheel 20. The roller wheel 20 is positioned on one of the side walls 26, 28, preferably the right side wall 28, but may be positioned at a different location on the housing. A side channel 32 is positioned in the side walls 26, 28 and extends inwardly from the side edges of the front and rear walls 22, 24 such that the front and rear walls 22, 24 provide a lip 34 around the side channel 32. In a preferred embodiment, the side channel 32 extends along part of the length of the side walls 26, 28 so that only a portion of the side walls is recessed. In an alternative embodiment, the side channels 32 may extend along the entire length of the side walls 26, 28.

The side channel 32 design improves the ergonomics of the housing 12. The side channels 32 provide the user with a gripping location on the device 10 and ease in operating the thumb wheel 20. The area of the side channel is great enough to allow a significant portion of the user's finger to enter the area to act upon the input or output device, such as the roller wheel or a key. In addition, the side channels 32 protect the thumb wheel 20 because the thumb wheel is positioned in the channel and, thus, recessed relative to the front and rear wall edges. Only part of the thumb wheel 20 protrudes from the side of the housing 12. In an alternative embodiment, the thumb wheel 20 is sized so that it does not protrude from the side of the device 10, providing further protection for the thumb wheel 20.

The example side walls 26, 28 include a lower portion 36 and an upper portion 38. The lower and upper portions are separated by a center line 40. In the example housing 12, the side walls 26, 28 are flush with the side edges of the front and rear walls 22, 24 of the housing 12 in the lower portion 36 of the device 10. In one embodiment, the lower portion 36 is the bottom half of the side walls 26, 28. In an alternative embodiment, the lower portion 36 includes less than the bottom half of the side walls 26, 28. In a further embodiment, the flush portion includes more than the bottom half of the side walls, such that the flush portion extends into the upper portion 38.

It is desirable that the lower portion 36 of the side walls 26, 28 be flush so that there are no protruding edges when a user holds the device 10 and types on the keypad 14, although this is not critical. As the user moves their finger or thumb up the side walls 26, 28 of the housing 12, the side walls 26, 28 begin to recess relative to the front and rear walls 22, 24 of the housing 12 such that a channel 32 is formed that protrudes inwardly. The thumb wheel 20 is positioned in this channel in the upper portion 38 of the side wall 26, 28. The channel 32 is useful in locating the thumb wheel 20 without having to visually inspect the device since the user may run their thumb or finger up the channel 32 until they locate the wheel 20. In one embodiment, the thumb wheel 20 is positioned near the top of the side wall 26, 28.

Referring to FIG. 1, on the right side of the device, the thumb wheel and an input button or key are positioned in the recessed channel. Both the thumb wheel or roller wheel and input button or key are input/output devices. The side channel has a width and length that is greater than the area in which the input and output devices are positioned. When compared to recesses 5, which were previously known, the recessed channel has a greater area in which to allow a greater part of the user's finger or thumb to enter the recess. While the recess 32 described herein is referred to as a channel, it may include other shapes. For example, the recess could have an irregular, oval shaped, square, or other shape. It is desirable that the recess have a shape to allow a greater portion of the user's finger to enter the recess. The term "channel" as used herein is not intended to be limited to the literal meaning of the term "channel," and the term "recessed channel" is meant to cover recesses of other shapes than "channel"-shaped, as long as the recess has a size to allow a greater portion of the user's finger of thumb to enter the recess around the input/output devices on the housing.

Figure 2:
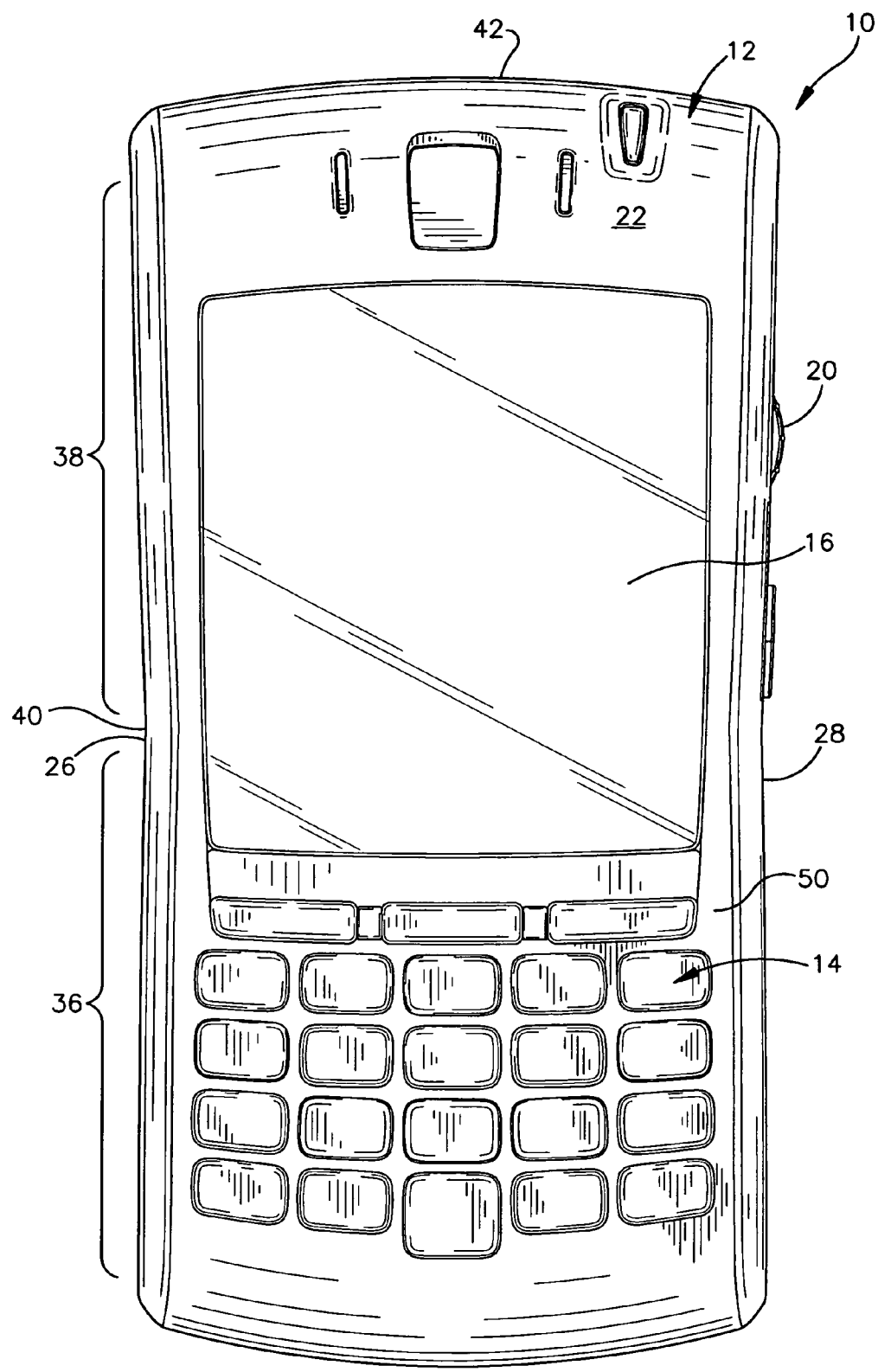
FIG. 2 is a front view of the device of FIG. 1.

The side channels or recesses 32 may be designed so that the thumb wheel 20 protrudes from the side of the housing 12 only within the recess 32. This design helps to protect the thumb wheel 20 from damage when the device 10 is accidentally dropped because the edges of the front and rear surfaces 22, 24 will contact the ground, not the thumb wheel. Alternatively, the thumb wheel 20 may extend outwardly from the side channel 32 so that it extends past the front and rear surfaces 22, 24 of the device 10, as shown in FIG. 2. An extending thumb wheel of this type is easier for a user to locate, among other advantages.

The side channels 32 are also beneficial when the mobile communication device 10 is used as a phone because the side channels provide a gripping location so that the user doesn't have to exert excessive force to maintain the phone in his or her hand during use. This helps to deter fatigue on the part of the user. The front and rear walls 22, 24 of the housing 12 also provide a protruding lip 32 around the recess, which provides a zone for gripping the device to remove it from a holster or carrying case.

Figure 8:
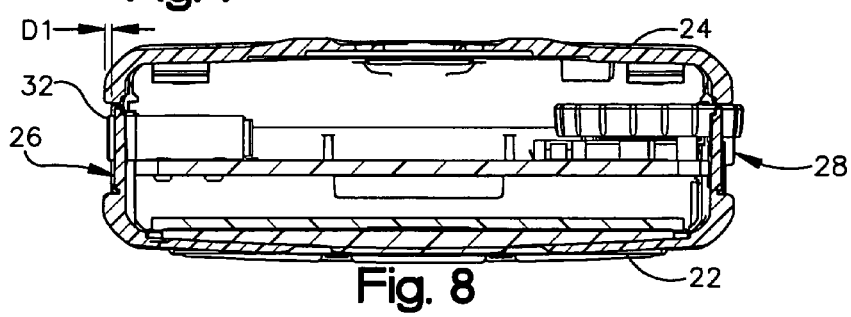
FIG. 8 is a cross-sectional view of the device of FIG. 7 taken at line 8-8 in FIG. 7.
Figure 9:
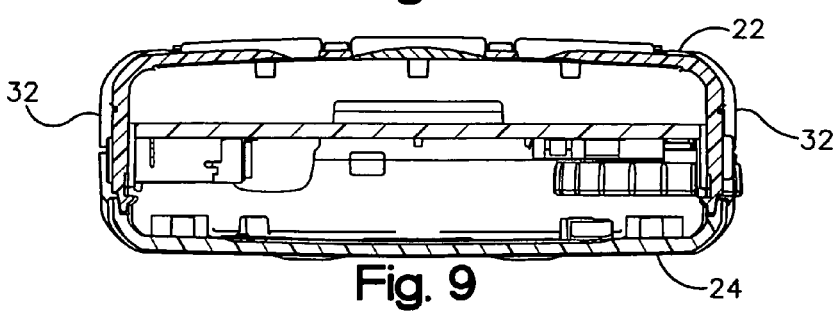
FIG. 9 is a cross-sectional view of the device of FIG. 7 taken at line 9-9 in FIG. 7.
Figure 13:
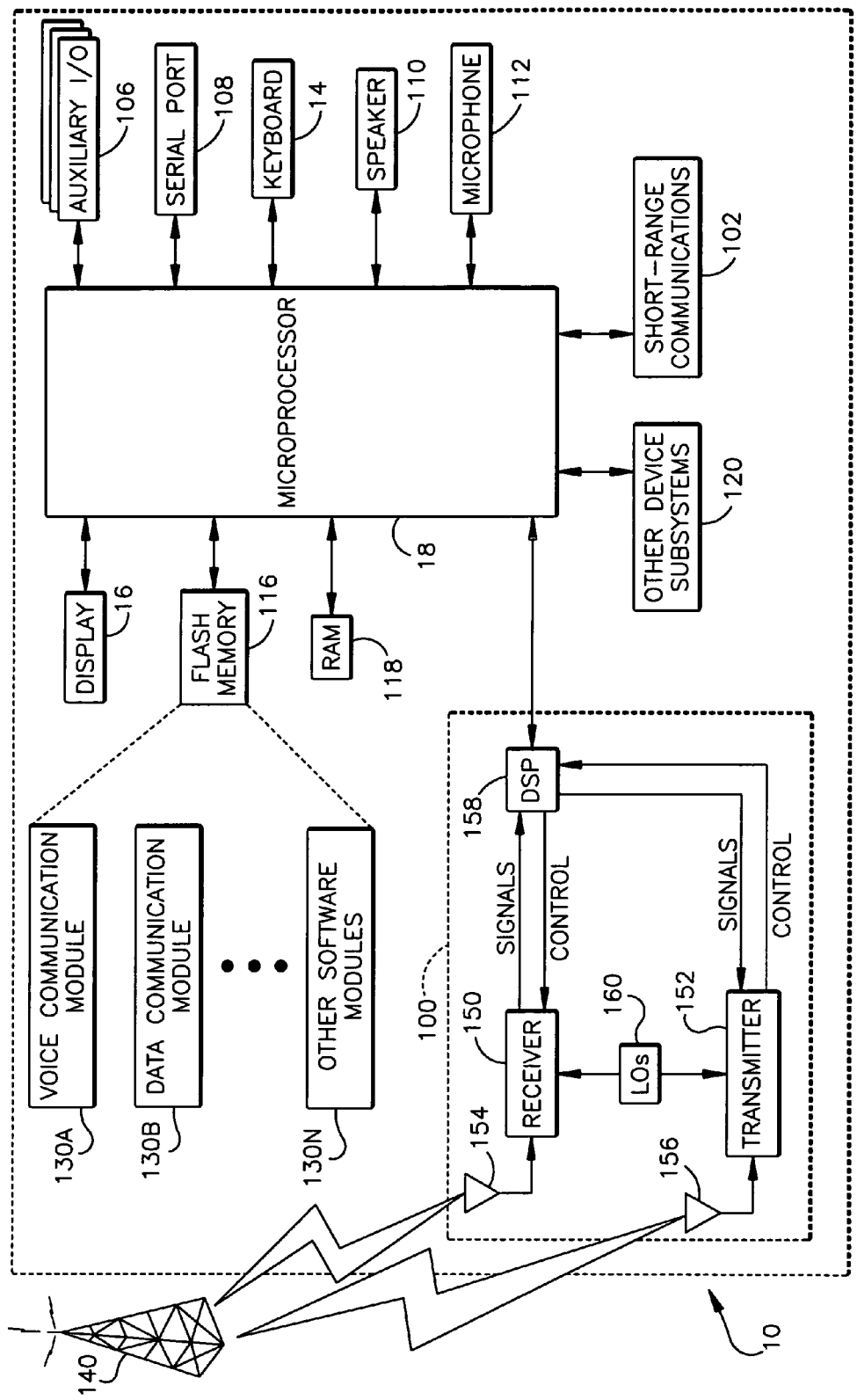
FIG. 13 is a block diagram illustrating an example mobile communication device system.

FIGS. 8, 9, and 11 show several cross-sectional views of the housing 12 that depict the side channels 32. In one embodiment, the depth D1 of the channel in the upper portion 38 is about 0.9 mm relative to the side edges of the front and rear walls, as shown in FIG. 8. The depth D2 of the channel in the upper portion 38 relative to the top wall 42, as shown in FIG. 11, is about 1.1 mm. FIG. 11 also shows how the channels 32 taper from zero recess at the center line 40 to a maximum recess at the top of the upper portion 38. Other dimensions and locations for the channels 32 may also be utilized according to the example discussed herein. The channels are advantageous in that they allow for greater access by the user's thumb or fingers around the roller wheel 20 or other peripheral input and output devices, among other advantages.

Figure 6:
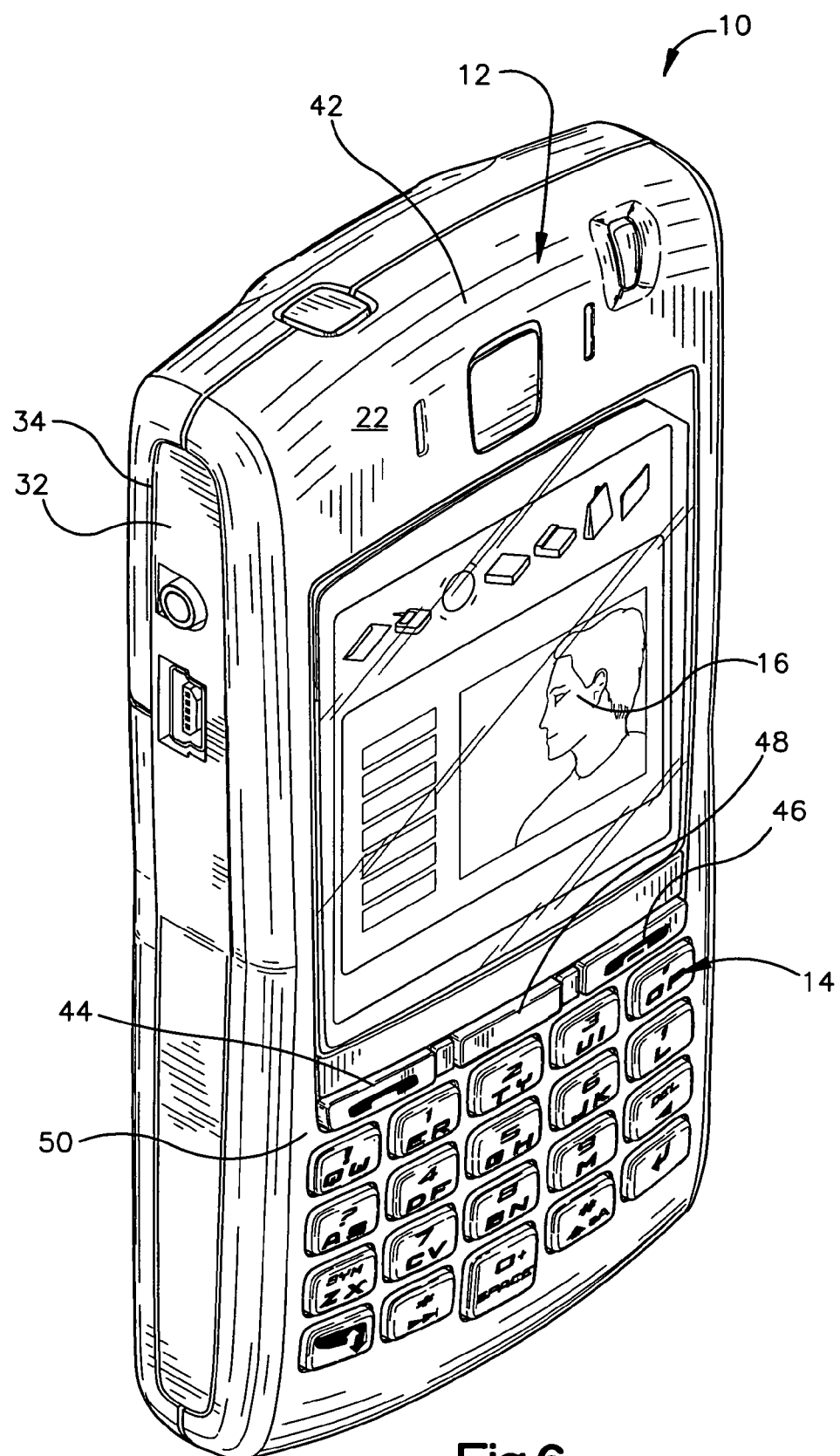
FIG. 6 is a perspective view of an alternative example handheld communication device.

Other features are also depicted in the Figures. As shown in FIG. 6, the keyboard 14 includes a reduced QWERTY keyboard layout, wherein numbers, letters and/or functions share keys, as discussed in U.S. patent application Ser. No. 10/785,790, filed Feb. 24, 2004, the disclosure of which is incorporated herein by reference in its entirety. Other types of standard keyboard arrangements of letters, or layouts, may also be utilized with design, including QWERTZ, AZERTY, and DVORAK, among other known keyboard arrangements. These noted arrangements include 26 letters. The keyboard 14 depicted in FIG. 6 includes a plurality of keys that are arranged in a grid pattern that includes five rows and five columns. The top row 50 of the keyboard includes a send key 44, an end key 46, and a web portal or browser key 48. Each of the rows in the reduced keyboard has an arcuate shape that is U-shaped. In addition, the top row 50 may or may not have a shape that is similar to that of the remaining rows. The web portal key 48 is preferably positioned between the send and end keys 44, 46, although it may be positioned at other locations.

Figure 3:
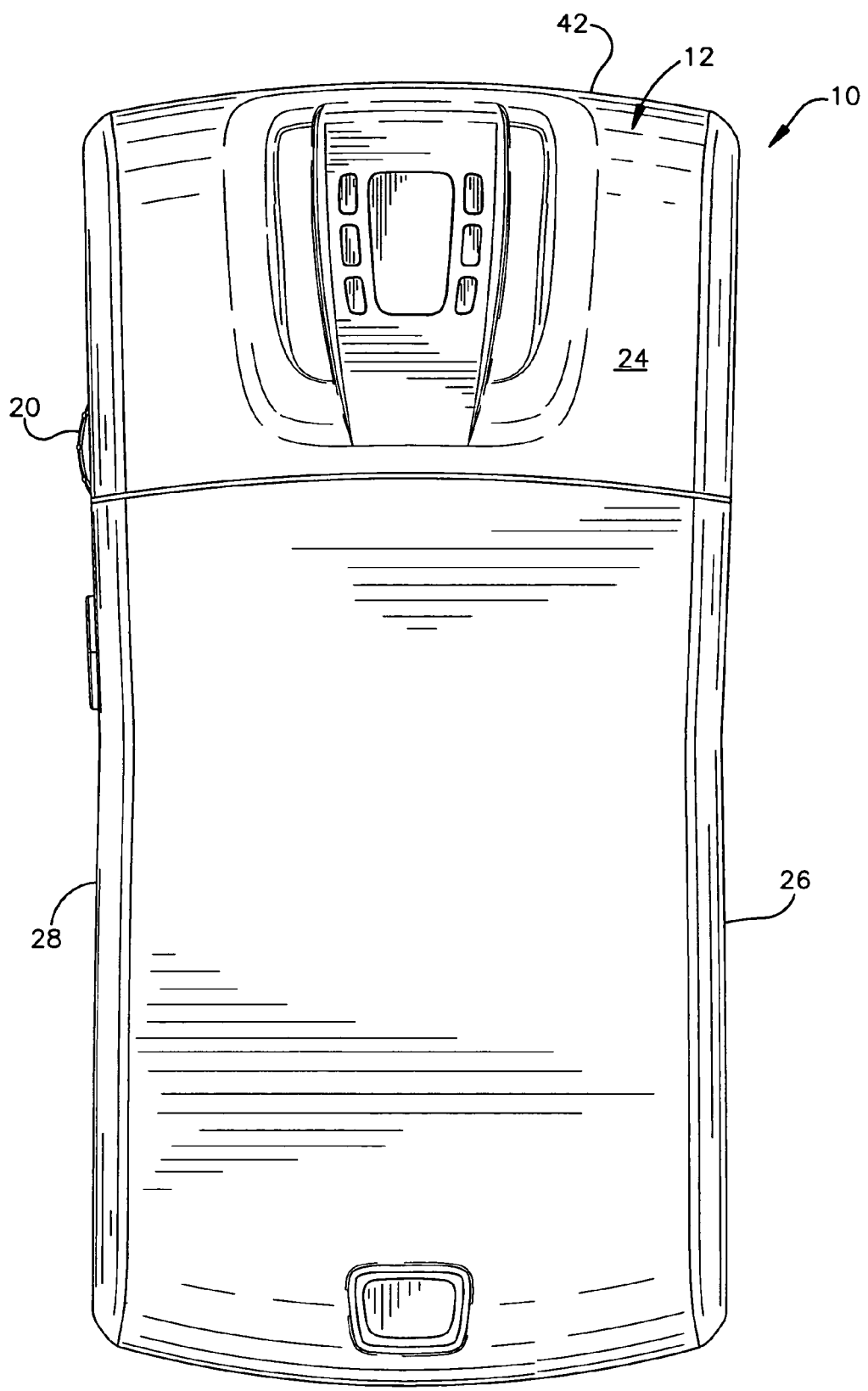
FIG. 3 is a rear view of the device of FIG. 1.
Figure 4:
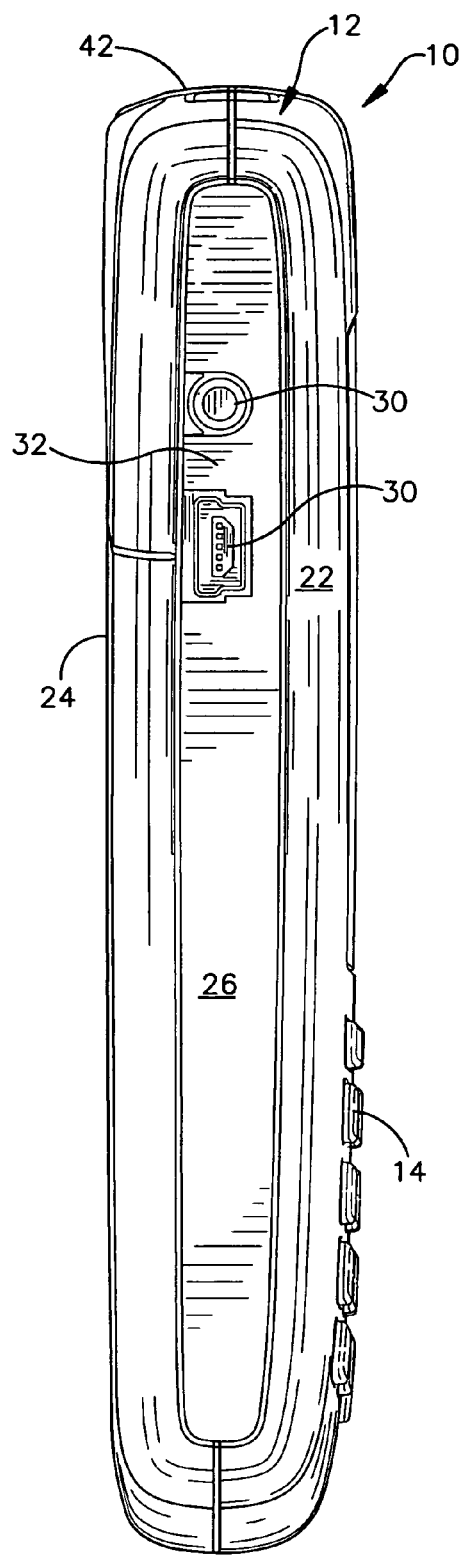
FIG. 4 is a left side view of the device of FIG. 1.
Figure 5:
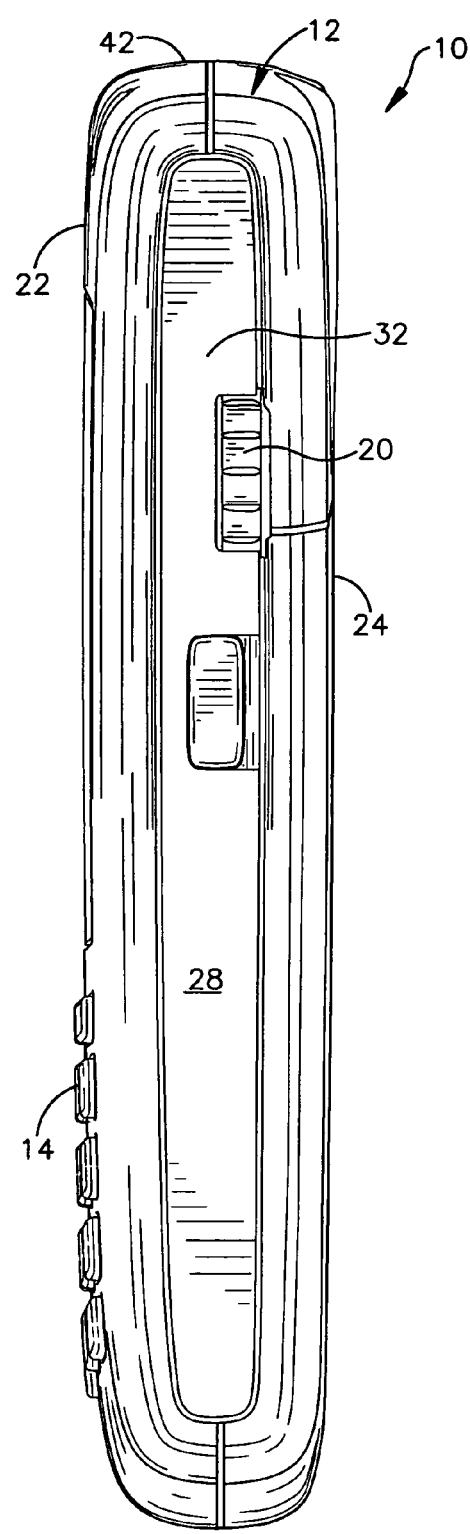
FIG. 5 is a right side view of the device of FIG. 1.
Figures 7, 10:
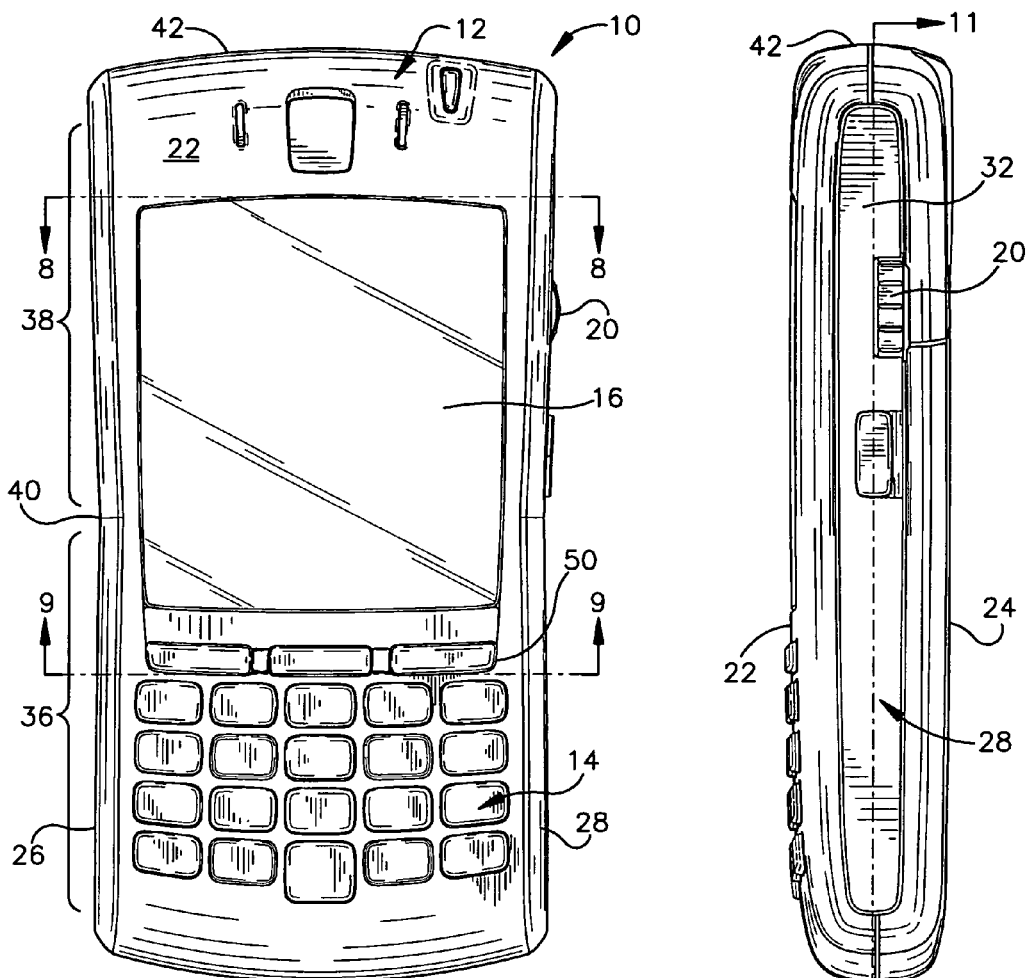
FIG. 7 is a front view of an example device similar to that in FIG. 1.
FIG. 10 is a right side view of an example device similar to that of FIG. 7.

In addition, as shown in FIGS. 2, 3, and 7, the outer contour of the side edges of the front and rear walls 22, 24 change angles in the middle of the side edges. In a preferred embodiment, this change in angles occurs at the center line 40. In this embodiment, the side walls are flush in the lower portion 36, below the angle change, and the side recess 32 emanates from the center line 40 upwardly, above the angle change. The recess or channel 32 is also known as an undercut.

The mobile communication device 10 may also include software, such as a predictive text computer program, that is used in conjunction with the keyboard 14. An example predictive text computer program is described in the following co-owned patent applications, which are incorporated herein by reference in their entirety: "Customizable Predictive Text Method For Reduced Keyboards," U.S. Provisional Patent Application No. 60/397,680, filed Jul. 23, 2002; "Systems and Methods of Building and Using Custom Word Lists," International Patent Application No. PCT/CA03/01103, filed Jul. 23, 2003, and "Portable Electronic Device With Keyboard", International Patent Application No. PCT/CA02/00862, filed Jun. 10, 2002. In a multi-tap methodology, the user taps a key multiple times until a desired letter, number, symbol, or function is selected. In the present case, a multi-tap method could be utilized to select among the multiple characters or fictions associated with each key, rather than the shift function.

Another technology involves predictive text methodologies. These methodologies utilize database software to predict the entered text. One method involves automatically correcting common spelling mistakes (e.g., "teh" corrected to "the"). Predictive text methodologies use known spellings of words in combination with their probabilities and frequencies of use to determine a preferred word based upon input commands by a user. Disambiguation engines and predictive editor applications may be used to establish a single grammatical or semantic interpretation of the keystrokes entered by a user. With predictive editor applications, the display of the device depicts possible character sequences corresponding to the keystrokes that were entered. Typically, the most commonly used word is displayed first. The user may select other, less common words manually, or otherwise. Other types of predictive text computer programs may be utilized with the keyboard 14 described herein, without limitation.

The handheld mobile communication devices 10, presented in FIGS. 4-9 include similar features, such as a housing 12, a keyboard 14 and an output device 16. The output device shown is a display 16, which is preferably a full graphic LCD. Other types of output devices may alternatively be utilized. A processing device 18, which is shown schematically in FIG. 10, is contained within the housing 12 and is coupled between the keyboard 14 and the display 16. The processing device 18 controls the operation of the display 16, as well as the overall operation of the mobile communication device 10, in response to actuation of keys on the keyboard 14 by the user.

The housing 12 may be elongated vertically, or may take on other sizes and shapes. The keyboard may include a mode selection key, or other hardware or software for switching between text entry and telephony entry.

In addition to the processing device 18, other parts of the mobile communication device 10 are shown schematically in FIG. 10. These include a communications subsystem 100; a short-range communications subsystem; the keyboard 14 and the display 16, along with other input/output devices 106, 108, 110 and 112; as well as memory devices 116, 118 and various other device subsystems 120. The mobile communication device 10 is preferably a two-way RF communication device having voice and data communication capabilities. In addition, the mobile communication device 10 preferably has the capability to communicate with other computer systems via the Internet.

Operating system software executed by the processing device 18 is preferably stored in a persistent store, such as a flash memory 116, but may be stored in other types of memory devices, such as a read only memory (ROM) or similar storage element. In addition, system software, specific device applications, or parts thereof, may be temporarily loaded into a volatile store, such as a random access memory (RAM) 118. Communication signals received by the mobile communication device may also be stored to the RAM 118.

The processing device 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application, and which is incorporated herein by reference.

Communication fictions, including data and voice communications, are performed through the communication subsystem 100, and possibly through the short-range communications subsystem. The communication subsystem 100 includes a receiver 150, a transmitter 152, and one or more antennas 154, 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile communication device 10 is intended to operate. For example, a mobile communication device 10 may include a communication subsystem 100 designed to operate with the Mobitex™, Data TAC™ or General Packet Radio Service (GPRS) mobile data communication networks and also designed to operate with any of a variety of voice communication networks, such as AMPS, TDMA, CDMA, PCS, GSM, etc. Other types of data and voice networks, both separate and integrated, may also be utilized with the mobile communication device 10.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the processing device 18. The received signal is then further processed by the processing device 18 for an output to the display 16, or alternatively to some other auxiliary I/O device 106. A device user may also compose data items, such as e-mail messages, using the keyboard 14 and/or some other auxiliary I/O device 106, such as a touchpad, a rocker switch, a thumb-wheel, or some other type of input device. The composed data items may then be transmitted over the communication network 140 via the communication subsystem 100.

In a voice communication mode, overall operation of the device is substantially similar to the data communication mode, except that received signals are output to a speaker 110, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

The word "substantially" if present is used herein as an estimation term.

While various features of the claimed embodiments are presented above, it should be understood that the features may be used singly or in any combination thereof. Therefore, the claimed embodiments are not to be limited to only the specific embodiments depicted herein.

Further, it should be understood that variations and modifications may occur to those skilled in the art to which the claimed embodiments pertain. The embodiments described herein are exemplary. The disclosure may enable those skilled in the art to make and use embodiments having alternative elements that likewise correspond to the elements recited in the claims. The intended scope may thus include other embodiments that do not differ or that insubstantially differ from the literal language of the claims. The scope of the example embodiments is accordingly defined as set forth in the appended claims.

What is claimed is:

1. A mobile communication device comprising:
   a housing having a length and at least a first side wall and a second side wall, wherein at least one of the first and second side walls includes a recessed channel that extends along at least part of the length of the housing, with the side walls having an upper portion and a lower portion defined on the housing and separated from one another at an intermediate point on the associated side wall, and the recessed channel extends in the upper portion.

2. The device of claim 1, wherein the recessed channel is associated with both the first side wall and the second side wall.

3. The device of claim 2, wherein the lower portion and the upper portion are divided by a center line at the intermediate point.

4. The device of claim 3, wherein each of the recessed channels tapers from flush with the side walls at the center line to recessed at the top of the upper portion relative to the side walls.

5. The device of claim 3, wherein each of the recessed channels tapers from flush with the side walls at a point within the lower portion to recessed relative to the side walls at a point within the upper portion.

6. The device of claim 3, wherein the upper portion comprises the upper half of each of the side walls, and the lower portion comprises the lower half of each of the side walls.

7. The device of claim 1, further comprising a roller wheel associated with one of the side walls, the roller wheel being positioned in the recessed channel.

8. The device of claim 1, further comprising a front wall and a rear wall associated with the housing, with the first and second side walls being positioned between the front and rear walls, and with a display and a keyboard being coupled to the front wall, wherein at least one input or output device is positioned in the recessed channel.

9. A housing for a mobile communication device comprising:
   a front wall;
   a rear wall;
   a left side wall comprising a recessed channel that extends along at least part of the left side wall such that at least part of the left side wall is recessed relative to the remainder of the left side wall; and a right side wall comprising a recess that extends along at least part of the right side wall such that at least part of the right side wall is recessed relative to the remainder of the right side wall, with the side walls each having an upper portion and a lower portion that are separated from one another at an intermediate point on the associated side wall, and the recessed channel extends only in the upper portion.

10. The housing of claim 9, wherein the recessed channel on the left side wall extends along part of the length of the wall and the recessed channel on the right side wall extends along part of the length of the wall, and further comprising at least one auxiliary input and output positioned within the recessed channels.

11. The housing of claim 10, wherein the at least one auxiliary input and outputs comprises a roller wheel positioned in the recessed channel of the right side wall.

12. The housing of claim 11, wherein the roller wheel has a dimension that extends outwardly from the side wall past the front and rear walls.

13. A mobile communication device comprising:
a housing having a length, a front wall, a rear wall, a first side wall positioned between the front and rear walls on a first side of the housing, and a second side wall positioned between the front and rear walls on a second side of the housing, with each side wall having a top point, an intermediate point, and a bottom point, wherein at least one of the first and second side walls includes a recessed channel that extends along at least part of the length of the respective wall, with the recessed channel tapering from the intermediate point where it is not recessed relative to the respective side wall to at least one of the top or bottom points where it is recessed relative to the respective side wall.

14. The mobile communication device of claim 13, wherein both the first and second side walls having a recessed portion, the top point is defined in the vicinity of the top end of the respective side wall, and the intermediate point is defined in the vicinity of the center of the side wall, and the recessed channel tapers from flush with the respective side wall at the intermediate point to recessed at the top point.

15. The mobile communication device of claim 14, wherein the amount of recess of the recessed portion is greatest at the top point.

* * * * *